United States Patent Office
3,342,753
Patented Sept. 19, 1967

1

3,342,753
METHOD FOR MAKING ELECTRICALLY CONDUCTIVE VITREOUS MATERIALS
Hendrikus Johan Lodewijk Trap, Emmasingel, Eindhoven, Netherlands, assignor to North American Philips Company, Inc., New York, N.Y., a corporation of Delaware
No Drawing. Filed Mar. 21, 1963, Ser. No. 266,791
Claims priority, application Netherlands, Mar. 30, 1962, 276,626
5 Claims. (Cl. 252—518)

My invention relates to vitreous materials exhibiting electrical conductivity and to a method of manufacturing these materials.

Sintered oxidic materials which exhibit electrical conductivity due to the material containing at least one metal ion in more than one valency are known. The possibilities for the use of such materials are somewhat limited, since they are manufactured by sintering and hence, in the most favorable case products are obtained which approach, but never attain the theoretical density. Consequently, such products do not have optimum properties.

The shaping of sintered bodies is also subject to certain restrictions; and, the sintering treatment usually requires a high temperature. Consequently, such bodies are not particularly attractive either from a technological view point, or with a view to the reproducibility of the desired physical properties. For these two reasons, preference should be given to electrically conductive vitreous materials. However, an electrically-conductive glass having a conductivity sufficiently high for practical use has not been described heretofore.

A known electrically conductive glass consists of an alkali-silicate glass containing titanium oxide in which the titanium ions are present in different valencies and in a total quantity of 14 to 45% by weight, calculated as the oxide. In the most favorable case such a glass has a specific resistance of not less than 20,000 ohms-cm., measured at 50° C. (cf. Table II).

Accordingly, it is a principal object of my invention to provide an electrically conductive glass of low specific resistance and a high electrical conductivity.

A further object of my invention is to provide an electrically conductive glass having a specific resistance of only 10 to 1,000 ohms-cm., measured at 50° C.

A still further object of my invention is to provide a method of making an electrically conductive glass.

These and further objects of the invention will appear as the specification progresses.

In accordance with the invention, an electrically conductive glass having a specific resistance $(\rho)$, measured at 50° C., of only 10 to 1,000 ohms-cm. has a composition constituted by at least 80 mol. percent of the following components: (1) At least one of the oxides $SiO_2$ and $B_2O_3$ and further $Al_2O_3$, (2) $Na_2O$ and the oxides $Fe_2O_3$ and $FeO$ in a molecular ratio between 1:2 and 4:1, in quantities in mol. percent defined in the following manner, the total of $Fe_2O_3$ and $FeO$ being calculated as $Fe_3O_4$:

$$15 < SiO_2 + B_2O_3 < 75$$

$$30 - 2[B_2O_3] \leqslant SiO_2 \leqslant 65 - \tfrac{3}{4}[B_2O_3]$$

$$21 - \tfrac{1}{6}[SiO_2 + B_2O_3] < Fe_3O_4 < 40 - \tfrac{1}{3}[SiO_2 + B_2O_3]$$

$$2 < Al_2O_3 < 30 - \tfrac{3}{8}[SiO_2]$$

$$3 < Na_2O < 30$$

while the remaining maximum portion of 20 mol. per-

2 cent one or more of the following components may be present:

| | Mol. percent |
|---|---|
| $Co_3O_4$ | $<12$ |
| $MnO$ | $<12$ |
| $NiO$ | $<8$ |
| $ZnO$ | $<12$ |
| $CaO$ | $<6$ |
| $MgO$ | $<8$ |
| $SrO$ | $<6$ |

In order to obtain glass of this composition, the oxides, or compounds which change to these oxides upon heating, are melted in the manner usual in the glass industry in a weakly-reducing to a weakly-oxidizing atmosphere at a temperature from 1,000° C. to 1,650° C.

A weakly-reducing atmosphere is obtained by melting the initial materials in a flame which is supplied with a mixture of hydrogen and oxygen containing an excess of 10% by volume of hydrogen with respect to the stoichiometric quantity by volume of oxy-hydrogen gas. A weakly-oxidizing atmosphere is obtained within a flame which is supplied by light gas and a small excess of oxygen, for example, in a quantity of 10% by volume.

The presence of ferric-ions in addition to ferrous-ions in a ratio which lies between 1:1 and 8:1, dependent upon which of the aforementioned kinds of atmosphere is chosen in which the glass is melted, is essential to the high electrical conductivity of glasses in accordance with the invention. For manufacturing the glass, the iron-oxide may be added to the mixture in the form of magnetite $(Fe_3O_4)$, if desired together with a ferrous-compound, for example, ferrous oxalate. If added in the form of separate ferric and ferrous compounds, for example, in the form of $Fe_2O_3$ and ferrous oxalate, a deviation is found which lies within the tolerance limit. So if $Fe_3O_4$ is used as the initial material, a reaction takes place between the $Fe_3O_4$ and the remaining components of the glass mixture. A comparison of the two methods of adding the iron-oxide by plotting on a graph log $\rho$, measured for example at 150° C., of a number of compositions in which iron oxide has been added to the mixture in the form of $Fe_3O_4$, and log $\rho'$ of the same compositions in which the oxide has been added in the form of a mixture of $Fe_2O_3$ and ferrous oxalate, gives a number of points which, on correction of the log $\rho$-values exhibit a straight-line relationship $$\log \rho' = 0.958 \log \rho - 0.005$$

upon correction of log $\rho'$ a straight-line relationship $$\log \rho' = 0.45 \log \rho + 1.41$$

is found. From this also appears the chemical reaction between the ferric oxide and the remaining components of the mixture and, furthermore, that the addition of iron oxide in the form of separate ferric and ferrous compounds is to be preferred.

It should also be noted that in glasses which do not contain cobalt oxide in trivalent and bivalent form, the melting atmosphere is only slightly critical with regard to the value obtained for the specific resistance. If, on the contrary, it is critical, melting in a weakly-reducing atmosphere yields log $\rho$-values lower by approximately unity than the values obtained upon melting in a weakly-oxidizing atmosphere. The conductivity of the glasses may be influenced by adding cobalt ions.

Glasses in accordance with the invention are usable as conducting seals, glass electrodes, as heating elements of, for example, toasters, as bulbs for Geiger counters, and the like. They are not transparent, but have a pitch-black color.

These glasses can be crystallized in known manner, a varying portion of the glass, dependent upon the thermal treatment, separating out as small crystals in finely dispersed form. This does not substantially influence the conductivity of the glass, but improves to a considerable extent its mechanical properties, in particular its hardness and its breakage-strength.

The invention will be described further in connection with the following examples which are illustrative thereof, the invention itself being defined in the following claims.

Table I shows a large number of compositions in accordance with the invention, and the Brigg's logarithm of the value of the specific resistance $\rho$ in ohm-cm. obtained therewith, measured at 100° C. and 50° C. The reference symbols "ox" and "red" designate the melting atmospheres used, viz. the oxidizing atmosphere and the reducing atmosphere in the aforesaid sense. Finally, the activating energy E in electron volts is given, calculated from the value of B of the relation $$\log \rho = A + \frac{B}{t}$$

the value of B being obtained from resistivity measurements at 50° C., 100° C., 150° C., 200° C., 300° C. and 500° C. The value of E in electron volts results from multiplication of B by the factor $0.198 \times 10^{-3}$.

Table II shows, for purposes of comparison, the same physical properties of some titanium-containing electrically-conductive glasses. Although it has been indicated elsewhere that such glasses have resistivities of from 2 to 200 ohms–cm., the temperature at which such values were obtained is not specified. Further investigation of those compositions having the lowest specified resistivity values and with measurements performed at 50° C. and 100° C. indicate the results are considerably less favorable than those of compositions in accordance with the invention.

Finally, Table III represents some compositions which contain the components in accordance with the invention, in quantities lying outside the specified limits. The resistivities of bodies of such compositions are considerably higher than those in accordance with the invention.

TABLE I

| Composition in mol. percent | | | | | | | | | | | | log ρ 100° C. | | log ρ 50° C. | | E A |
|---|---|---|---|---|---|---|---|---|---|---|---|---|---|---|---|---|
| SiO₂ | B₂O₃ | Al₂O₃ | Na₂O | Fe₃O₄ | Co₃O₄ | MnO | MgO | NiO | ZnO | CaO | SrO | Ox. | Red. | Ox. | Red. | (e.V.) |
| 32 | 32 | 4 | 18 | 14 | | | | | | | | | 2.67 | | 2.79 | 0.056 |
| | | | | | | | | | | | | | 2.57 | | 2.64 | 0.051 |
| 40 | 20 | 6 | 20 | 14 | | | | | | | | 2.98 | | 3.13 | | 0.071 |
| 34 | | 7.5 | 26 | 20 | | | 3.75 | 3.75 | 5 | | | 2.91 | | 3.04 | | 0.066 |
| 40.5 | | 6.75 | 23.5 | 18 | | | 3.38 | 3.37 | 4.5 | | | 3.27 | | 3.45 | | 0.078 |
| 47 | | 6 | 21 | 16 | | | 3 | 3 | 4 | | | 3.34 | | 3.46 | | 0.056 |
| 53.5 | | 5.25 | 18.5 | 14 | | | 2.63 | 2.62 | 3.5 | | | 3.16 | | 3.29 | | 0.065 |
| 60 | | 4.5 | 16 | 12 | | | 2.25 | 2.25 | 3 | | | 2.05 | | 2.14 | | 0.043 |
| 34 | | 7.5 | 26 | 20 | | | 1.25 | 1.25 | 10 | | | 2.47 | | 2.58 | | 0.056 |
| 40.5 | | 6.75 | 23.5 | 18 | | | 1.13 | 1.12 | 9 | | | 2.39 | | 2.52 | | 0.061 |
| 47 | | 6 | 21 | 16 | | | 1 | 1 | 8 | | | 2.06 | | 2.12 | | 0.030 |
| 53.5 | | 5.25 | 18.5 | 14 | | | 0.88 | 0.87 | 7 | | | 2.27 | | 2.32 | | 0.027 |
| 60 | | 4.5 | 16 | 12 | | | 0.75 | 0.75 | 6 | | | 2.74 | | 2.91 | | 0.079 |
| 34.3 | | 2.5 | 26.2 | 20.1 | | | 2.5 | 7.6 | 6.8 | | | 3.06 | | 3.29 | | 0.108 |
| 41.1 | | 2.3 | 23.8 | 18.3 | | | 2.3 | 6.7 | 5.5 | | | 1.11 | | 1.18 | | 0.032 |
| 34.3 | | 7.55 | 26.2 | 20.15 | | | 2.5 | 2.5 | 6.8 | | | 1.47 | | 1.55 | | 0.039 |
| 41.5 | | 6.9 | 24.0 | 18.4 | | | 2.3 | 2.3 | 4.6 | | | 1.43 | | 1.54 | | 0.049 |
| 47.3 | | 6.0 | 21.1 | 16.1 | | | 2.0 | 2.0 | 5.5 | | | 2.13 | | 2.26 | | 0.059 |
| 53.8 | | 5.2 | 18.6 | 14.1 | | | 1.75 | 1.75 | 4.8 | | | 2.58 | | 2.72 | | 0.068 |
| 60.25 | | 4.5 | 16.1 | 12.05 | | | 1.5 | 1.5 | 4.1 | | | | 0.88 | | 1.01 | 0.06 |
| | 16 | 28 | 11.2 | 33.6 | 2.8 | 8.4 | | | | | | | 1.20 | | 1.34 | 0.065 |
| | 34 | 22 | 8.8 | 26.4 | 2.2 | 6.6 | | | | | | | 1.84 | | 1.98 | 0.07 |
| | 52 | 16 | 6.4 | 19.2 | 1.6 | 4.8 | | | | | | | 2.51 | | 2.73 | 0.10 |
| | 64 | 12 | 4.8 | 14.4 | 1.2 | 3.6 | | | | | | 0.29 | 0.49 | 0.41 | 0.64 | 0.07 |
| | 16 | 28 | 11.2 | 33.6 | | 11.2 | | | | | | 1.77 | 1.68 | 1.97 | 1.83 | 0.095 |
| | 40 | 20 | 8.0 | 24 | | 8 | | | | | | 2.06 | 1.94 | 2.19 | 2.16 | 0.15 |
| | 52 | 16 | 6.4 | 19.2 | | 6.4 | | | | | | 2.95 | 2.25 | 3.14 | 2.47 | 0.15 |
| | 64 | 12 | 4.8 | 14.4 | | 4.8 | | | | | | | 1.94 | | 2.28 | 0.16 |
| | 16 | 28 | 11.2 | 33.6 | 11.2 | | | | | | | | 2.62 | | 3.02 | 0.20 |
| | 40 | 20 | 8 | 24 | 8 | | | | | | | | | | 3.02 | |
| | 58 | 14 | 5.6 | 16.8 | | 5.6 | | | | | | | | | | 0.102 |
| | 34 | 22 | 8.8 | 26.4 | | 8.8 | | | | | | | 3.04 | | 3.17 | |
| 40 | | 12 | 24 | 15 | | 3 | | | | 3 | 3 | | 3.09 | | 2.49 | |
| 40 | | 12 | 24 | 18 | | | | | | 3 | 3 | | 1.48 | | 3.38 | |
| 50 | | 5 | 15 | 15 | 5 | 5 | 5 | | | | | | 1.93 | | 1.34 | 0.064 |
| 35.6 | | 6.6 | 26.6 | 24.6 | | | 6.6 | | | | | | 0.80 | | 2.03 | 0.048 |
| 24 | 48 | 4 | 14 | 10 | | | | | | | | | | | 0.84 | 0.018 |
| 18 | 36 | 7 | 23 | 16 | | | | | | | | 2.05 | | 2.24 | | 0.089 |
| 18.5 | 37 | 7.2 | 23.6 | 13.7 | | | | | | | | | 2.31 | | 2.47 | 0.076 |
| 20 | 40 | 6 | 20 | 14 | | | | | | | | | | | | |
| 16.5 | 33.1 | 8.1 | 26.8 | 15.5 | | | | | | | | 0.87 | | 0.93 | | 0.028 |

TABLE II

| Composition, weight percent | | | | | | | | | | | | log ρ 100° C. | | log ρ 50° C. | | E A |
|---|---|---|---|---|---|---|---|---|---|---|---|---|---|---|---|---|
| Na₂O | SiO₂ | TiO₂ | TiO | Ti₂O₃ | Al₂O₃ | B₂O₃ | F₂ | BaO | CaO | MgO | CaF₂ | Ox. | Red. | Ox. | Red. | (e.V.) |
| 10 | 40 | 45 | | | 5 | | | | | | | 7.36 | 4.32 | 8.42 | 4.46 | 0.068 |
| 15 | 40 | 40 | | | 5 | | | | | | | 5.02 | | 5.21 | | |
| 10 | 40 | | 25 | | | | | 13 | 4.9 | 3.5 | 3.6 | | 9.25 | | 10.60 | 0.65 |
| 14.3 | 33.1 | | 34.5 | | 6.1 | 2.1 | 6 | 3 | | | | 12.54 | | 14.72 | | 1.04 |
| 10 | 40 | | | 40.5 | | | 9.5 | | | | | 7.78 | 5.21 | 9.025 | 5.39 | 0.59 |
| 13.3 | 36.3 | | 25.0 | | 6.8 | 3.5 | 10 | 5 | | | | 13.30 | 10.17 | 15.61 | 12.87 | 1.10 |

TABLE III

| Composition in mol. percent | | | | | | | | | | | | log ρ 100° C. | | log ρ 50° C. | | EA |
|---|---|---|---|---|---|---|---|---|---|---|---|---|---|---|---|---|
| $SiO_2$ | $B_2O_3$ | $Al_2O_3$ | $Na_2O$ | $Fe_3O_4$ | $Co_3O_4$ | MnO | MgO | NiO | ZnO | CaO | SrO | Ox. | Red. | Ox. | Red. | (e.V.) |
| 4.89 | 24.4 | 4.1 | 14.2 | 8.4 | ------ | ------ | ------ | ------ | ------ | ------ | ------ | 9.80 | ------ | 11.4 | ------ | 0.71 |
| ------ | 76 | 8 | 3.2 | 9.6 | 0.8 | 2.4 | ------ | ------ | ------ | ------ | ------ | ------ | 6.28 | ------ | 6.98 | 0.325 |
| 36 | ------ | 6.4 | 25.6 | 1.4 | 4.8 | 6.4 | 6.4 | ------ | ------ | ------ | ------ | ------ | 5.37 | ------ | 5.51 | ------ |
| ------ | 76 | 8 | 3.2 | 9.6 | ------ | 3.2 | ------ | ------ | ------ | ------ | ------ | 7.81 | 6.94 | 8.65 | 7.60 | 0.315 |
| 60.65 | ------ | 1.5 | 16.1 | 12.1 | ------ | ------ | 1.5 | 4.55 | 3.6 | ------ | ------ | 4.81 | ------ | 5.03 | ------ | 0.124 |
| 40 | ------ | 6 | 24 | 9 | ------ | 15 | ------ | ------ | ------ | 3 | 3 | 10.79 | 10.44 | 12.69 | 12.02 | 0.90 |
| 48 | 24 | 4 | 14 | 10 | ------ | ------ | ------ | ------ | ------ | ------ | ------ | 9.80 | ------ | 11.40 | ------ | 0.76 |
| 35 | ------ | 6.5 | 26 | 6.5 | 13 | 6.5 | 6.5 | ------ | ------ | ------ | ------ | 9.75 | ------ | 11.36 | ------ | 0.77 |
| 35 | ------ | 6.5 | 26 | 13 | ------ | 6.5 | 6.5 | ------ | ------ | 6.5 | ------ | 7.22 | ------ | 8.61 | ------ | 0.67 |

While I have described my invention with reference to specific examples and applications, other modifications will be apparent to those skilled in this art without departing from the spirit and scope of the invention.

What I claim is:

1. A method of manufacturing an electrically conductive vitreous material comprising the steps, mixing $Al_2O_3$, $Na_2O$, iron oxide in the form of $Fe_3O_4$, at least one oxide selected from the group consisting of $SiO_2$ and $B_2O_3$, said oxides together constituting a first group of oxides, and an oxide of the group consisting of $Co_3O_4$, MnO, NiO, ZnO, MgO, CaO, and SrO in proportions yielding upon heating a composition constituted of at least 80 mol percent of the first group of oxides in the following proportions:

$$15 < SiO_2 + B_2O_3 < 75$$
$$30 - 2[B_2O_3] \leq SiO_2 \leq 65 - \tfrac{3}{4}[B_2O_3]$$
$$21 - \tfrac{1}{6}[SiO_2 + B_2O_3] < Fe_3O_4 < 40 - \tfrac{1}{3}[SiO_2 + B_2O_3]$$
$$2 < Al_2O_3 < 30 - \tfrac{3}{8}[SiO_2]$$
$$3 < Na_2O < 30$$

and not more than 20 mol percent of the second group of oxides in the following proportions:

| | Mol percent |
|---|---|
| $Co_3O_4$ | <12 |
| MnO | <12 |
| NiO | <8 |
| ZnO | <12 |
| MgO | <8 |
| CaO | <6 |
| SrO | <6 | and heating said mixture to a temperature of about 1000° C. to 1650° C. in a weakly-reducing to weakly-oxidizing atmosphere to melt said constituents and form said vitreous material.

2. A method as claimed in claim 1 in which the atmosphere is constituted of combustion products of a mixture of oxygen and hydrogen containing an excess of 10% by volume of hydrogen with respect to the stoichiometric quantity by volume of oxyhydrogen gas.

3. A method as claimed in claim 1 in which the atmosphere is constituted of combustion products of a mixture of light gas and about 10% by volume of oxygen.

4. A method as claimed in claim 1 in which the iron oxide also includes ferrous oxalate.

5. A method of manufacturing an electrically conductive vitreous material comprising the steps, mixing $Al_2O_3$, $Na_2O$, $Fe_2O_3$ and ferrous oxalate in proportions forming $Fe_3O_4$, at least one oxide selected from the group consisting of $SiO_2$ and $B_2O_3$, said oxides together constituting a first group of oxides, and an oxide of the group consisting of $Co_3O_4$, MnO, NiO, ZnO, MgO, CaO, and SrO in proportions yielding upon heating a composition constituted of at least 80 mol percent of the first group of oxides in the following proportions:

$$15 < SiO_2 + B_2O_3 < 75$$
$$30 - 2[B_2O_3] \leq SiO_2 \leq 65 - \tfrac{3}{4}[B_2O_3]$$
$$21 - \tfrac{1}{6}[SiO_2 + B_2O_3] < Fe_3O_4 < 40 - \tfrac{1}{3}[SiO_2 + B_2O_3]$$
$$2 < Al_2O_3 < 30 - \tfrac{3}{8}[SiO_2]$$
$$3 < Na_2O < 30$$

and not more than 20 mol percent of the second group of oxides in the following proportions:

| | Mol percent |
|---|---|
| $Co_3O_4$ | <12 |
| MnO | <12 |
| NiO | <8 |
| ZnO | <12 |
| MgO | <8 |
| CaO | <6 |
| SrO | <6 | and heating said mixture to a temperature of about 1000° C. to 1650° C. in a weakly-reducing to weakly-oxidizing atmosphere to melt said constituents and form said vitreous material.

References Cited

UNITED STATES PATENTS

| 2,616,859 | 11/1952 | Verwey | 252—520 |
| 2,786,819 | 3/1957 | Smith et al. | 252—519 |
| 3,093,598 | 6/1963 | McMillan et al. | 252—518 X |

LEON D. ROSDOL, *Primary Examiner.*

JULIUS GREENWALD, *Examiner.*

J. D. WELSH, *Assistant Examiner.*